US012739658B2

(12) United States Patent
Omiya et al.

(10) Patent No.: US 12,739,658 B2
(45) Date of Patent: Sep. 15, 2026

(54) RELAY STATION INSTALLATION POSITION CALCULATION DEVICE, INSTALLATION POSITION CALCULATION METHOD, AND INSTALLATION POSITION CALCULATION PROGRAM

(71) Applicant: NTT, Inc., Tokyo (JP)

(72) Inventors: Riku Omiya, Musashino (JP); Tomoaki Ogawa, Musashino (JP); Masashi Iwabuchi, Musashino (JP); Yasushi Takatori, Musashino (JP)

(73) Assignee: NTT, Inc., Tokyo (JP)

( * ) Notice: Subject to any disclaimer, the term of this patent is extended or adjusted under 35 U.S.C. 154(b) by 160 days.

(21) Appl. No.: 18/836,363

(22) PCT Filed: Feb. 17, 2022

(86) PCT No.: PCT/JP2022/006372

§ 371 (c)(1),
(2) Date: Aug. 7, 2024

(87) PCT Pub. No.: WO2023/157173

PCT Pub. Date: Aug. 24, 2023

(65) Prior Publication Data

US 2025/0142354 A1 May 1, 2025

(51) Int. Cl.
*H04W 16/18* (2009.01)
*H04W 16/26* (2009.01)

(52) U.S. Cl.
CPC .......... *H04W 16/18* (2013.01); *H04W 16/26* (2013.01)

(58) Field of Classification Search
CPC ............................ H04W 16/18; H04W 16/26
See application file for complete search history.

(56) References Cited

U.S. PATENT DOCUMENTS

| | | | | |
|---|---|---|---|---|
| 5,890,076 | A * | 3/1999 | Takano | H04W 16/18 455/67.11 |
| 8,718,712 | B2 * | 5/2014 | Motoyoshi | H04W 16/18 455/418 |
| 11,956,643 | B2 * | 4/2024 | Toshinaga | H04W 16/18 |

OTHER PUBLICATIONS

Arai et al., "AMAP: Adaptive Movable Access Point System for Offloading Efficiency Enhancement", IEICE Technical Report, RCS2016-43, May 2016, 12 pages including English Translation.

* cited by examiner

*Primary Examiner* — Kabir A Timory
(74) *Attorney, Agent, or Firm* — XSENSUS LLP

(57) ABSTRACT

An installation position calculation device of a relay station according to an embodiment includes: a first identification circuitry that identifies a position of an installed station candidate point at which an LOS region from the relay station is maximized; a next candidate point extraction circuitry that regards the position identified as a transmission point of a radio wave and extracts two or less top next installed station candidate point at which a next relay station maximizes the LOS region; a correction circuitry that corrects the position of each of the installed station candidate points extracted based on a Fresnel zone for the next relay station; and a second identification circuitry that identifies, as an installation position of the next relay station, a position of a next installed station candidate point at which a reflection angle of the radio wave toward the next installed station candidate point extracted is minimized.

8 Claims, 9 Drawing Sheets

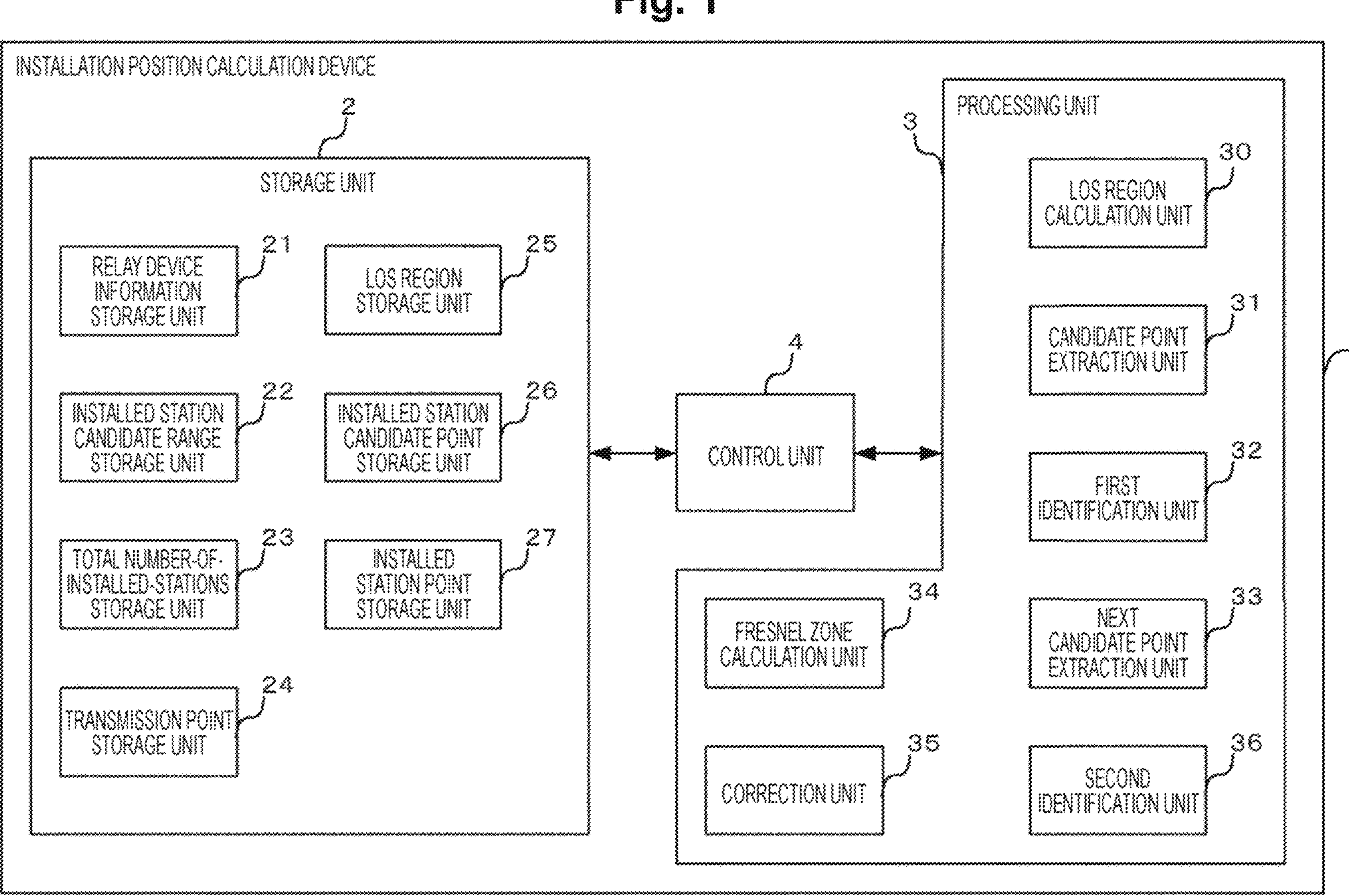
Fig. 1
INSTALLATION POSITION CALCULATION DEVICE
2
STORAGE UNIT
RELAY DEVICE INFORMATION STORAGE UNIT
21
LOS REGION STORAGE UNIT
25
INSTALLED STATION CANDIDATE RANGE STORAGE UNIT
22
INSTALLED STATION CANDIDATE POINT STORAGE UNIT
26
TOTAL NUMBER-OF-INSTALLED-STATIONS STORAGE UNIT
23
INSTALLED STATION POINT STORAGE UNIT
27
TRANSMISSION POINT STORAGE UNIT
24
4
CONTROL UNIT
3
PROCESSING UNIT
LOS REGION CALCULATION UNIT
30
CANDIDATE POINT EXTRACTION UNIT
31
FIRST IDENTIFICATION UNIT
32
FRESNEL ZONE CALCULATION UNIT
34
NEXT CANDIDATE POINT EXTRACTION UNIT
33
CORRECTION UNIT
35
SECOND IDENTIFICATION UNIT
36
1

10
NLOS REGION
LOS REGION
11
$B_1$
$B_2$
$B_3$
$B_4$
S
$L_1$
$L_2$
$L_3$

10
NLOS REGION
NLOS REGION
LOS REGION
S
B4
C1
C2
L1
Z1
11
12
a11
a12

Fig. 7
(a)
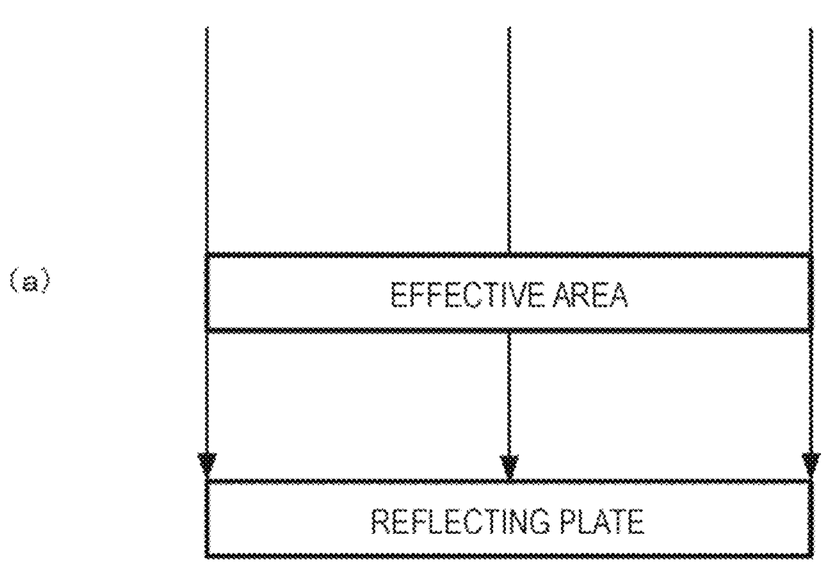
(b)
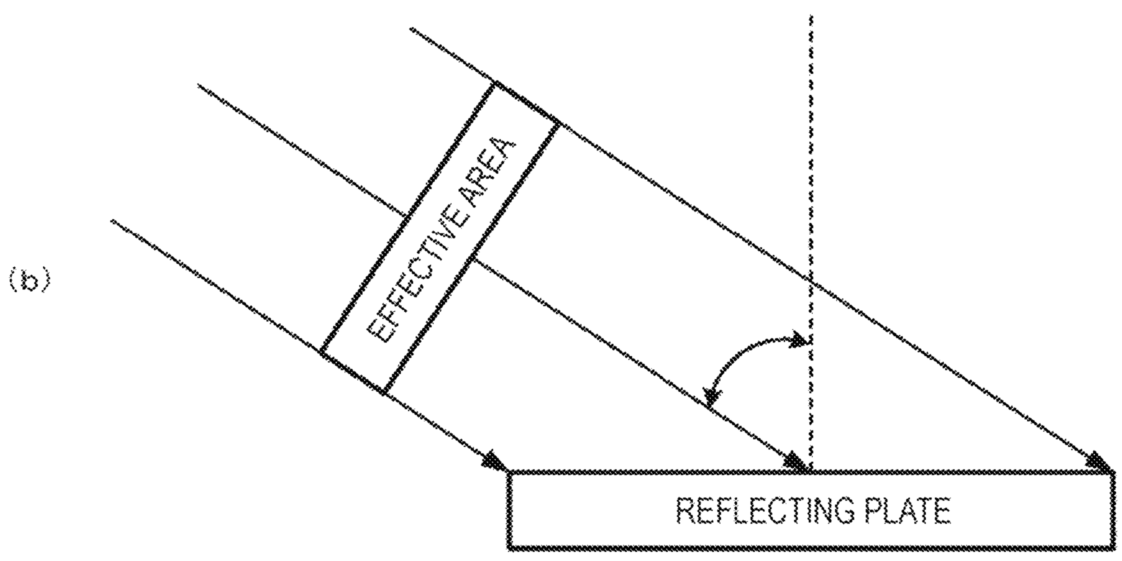

RELAY STATION INSTALLATION POSITION CALCULATION DEVICE, INSTALLATION POSITION CALCULATION METHOD, AND INSTALLATION POSITION CALCULATION PROGRAM

CROSS-REFERENCE TO RELATED APPLICATION

The present application is based on PCT filing PCT/JP2022/006372, filed Feb. 17, 2022, the entire contents of which is incorporated herein by reference.

TECHNICAL FIELD

The present invention relates to an installation position calculation device, an installation position calculation method, and an installation position calculation program of a relay station.

BACKGROUND ART

For example, in wireless communication systems using high frequency bands, there are wireless communication systems relaying radio waves transmitted from transmission stations to reception stations by reflecting the radio waves by reflecting plates. That is, the reflecting plates are relay stations (relay devices) relaying radio waves.

The reflecting plates reflecting radio waves also include reconfigurable intelligent surface (RIS) reflecting plates capable of electrically changing element characteristics and dynamically controlling reflection characteristics of electromagnetic waves.

In order to construct a wireless communication system relaying radio waves, a method of calculating an installed station position of a base station is known (see, for example, Non Patent Literature 1).

CITATION LIST

Non Patent Literature

Non Patent Literature 1: Takuto Arai and four others, "AMAP: Adaptive Movable Access Point System for Offloading Efficiency Enhancement", IEICE Technical Report, Institute of Electronics, Information and Communication Engineers, May 2016, RCS2016-43, pp. 107-112

SUMMARY OF INVENTION

Technical Problem

In order to enhance effects of a relay station such as an RIS reflecting plate, it is necessary to locate the relay station at a position within a line of sight (LOS) from a transmission station.

However, in the technique of the related art, it is only possible to calculate an installed station position of a base station emitting radio waves by itself, and it is difficult to calculate the installed station position of the relay station as it is.

For example, it is desirable to install a relay station including a reflecting plate or the like so that a decrease (loss) in propagation efficiency of radio waves to be relayed is inhibited. Here, a region within an LOS is referred to as an LOS region, and a region outside of an LOS is referred to as a non-line of sight (NLOS) region for distinguishment.

The present invention has been devised in view of the above-described problems, and an object of the present invention is to provide an installation position calculation device, an installation position calculation method, and an installation position calculation program of a relay station capable of calculating an installation position of a relay station so that a decrease in propagation efficiency of radio waves to be relayed is prevented.

Solution to Problem

According to an embodiment of the present invention, an installation position calculation device of a relay station includes: a first identification unit configured to identify a position of an installed station candidate point at which an LOS region from a relay station is maximized, as an installation position of a first relay station, based on a relayable range of a radio wave by the relay station within an installed station candidate range in which the relay station relaying the radio wave is installable or among a plurality of installed station candidate points determined in advance as installation position candidates of the relay station; a next candidate point extraction unit configured to regard an installation position of the first relay station identified by the first identification unit as a transmission point of the radio wave, and extract two or less top installed station candidate point at which a next relay station maximizes an LOS region based on a relayable range of the radio wave by the next relay station; a correction unit configured to correct a position of each of the next installed station candidate points extracted by the next candidate point extraction unit based on a Fresnel zone for the next relay station; a second identification unit configured to identify, as an installation position of the next relay station, a position of a next installed station candidate point at which a reflection angle of the radio wave toward the next installed station candidate point extracted by the next candidate point extraction unit or the next installed station candidate point of which the position is corrected by the correction unit is minimized; and a control unit configured to perform control such that a total number of installation positions of the relay stations identified by the first and second identification units becomes a predetermined number.

According to another embodiment of the present invention, an installation position calculation method of a relay station includes: a first identification step of identifying a position of an installed station candidate point at which an LOS region from a relay station is maximized, as an installation position of a first relay station, based on a relayable range of a radio wave by the relay station within an installed station candidate range in which the relay station relaying the radio wave is installable or among a plurality of installed station candidate points determined in advance as installation position candidates of the relay station; a next candidate point extraction step of regarding an identified installation position of the first relay station as a transmission point of the radio wave, and extracting two or less top installed station candidate point at which a next relay station maximizes an LOS region based on a relayable range of the radio wave by the next relay station; a correction step of correcting a position of each of the extracted next installed station candidate points based on a Fresnel zone for the next relay station; a second identification step of identifying, as an installation position of the next relay station, the extracted next installed station candidate point or a position of a next installed station candidate point at which a reflection angle of the radio wave toward the next installed station candidate point of which the position is corrected is minimized; and a control step of performing control such that a total number of installation positions of the relay stations identified in the first and second identification steps becomes a predetermined number.

Advantageous Effects of Invention

According to the present invention, it is possible to calculate an installation position of a relay station so that a decrease in propagation efficiency of radio waves to be relayed is prevented.

BRIEF DESCRIPTION OF DRAWINGS

FIG. 1 is a diagram illustrating a configuration example of an installation position calculation device of a relay station according to an embodiment.

FIG. 7(*a*) is a diagram illustrating a reflectable effective area of a radio wave incident on a reflecting plate when an incident angle is small. FIG. 7(*b*) is a diagram illustrating a reflectable effective area of the radio wave incident on the reflecting plate when the incident angle is large.

DESCRIPTION OF EMBODIMENTS

Figure 2:
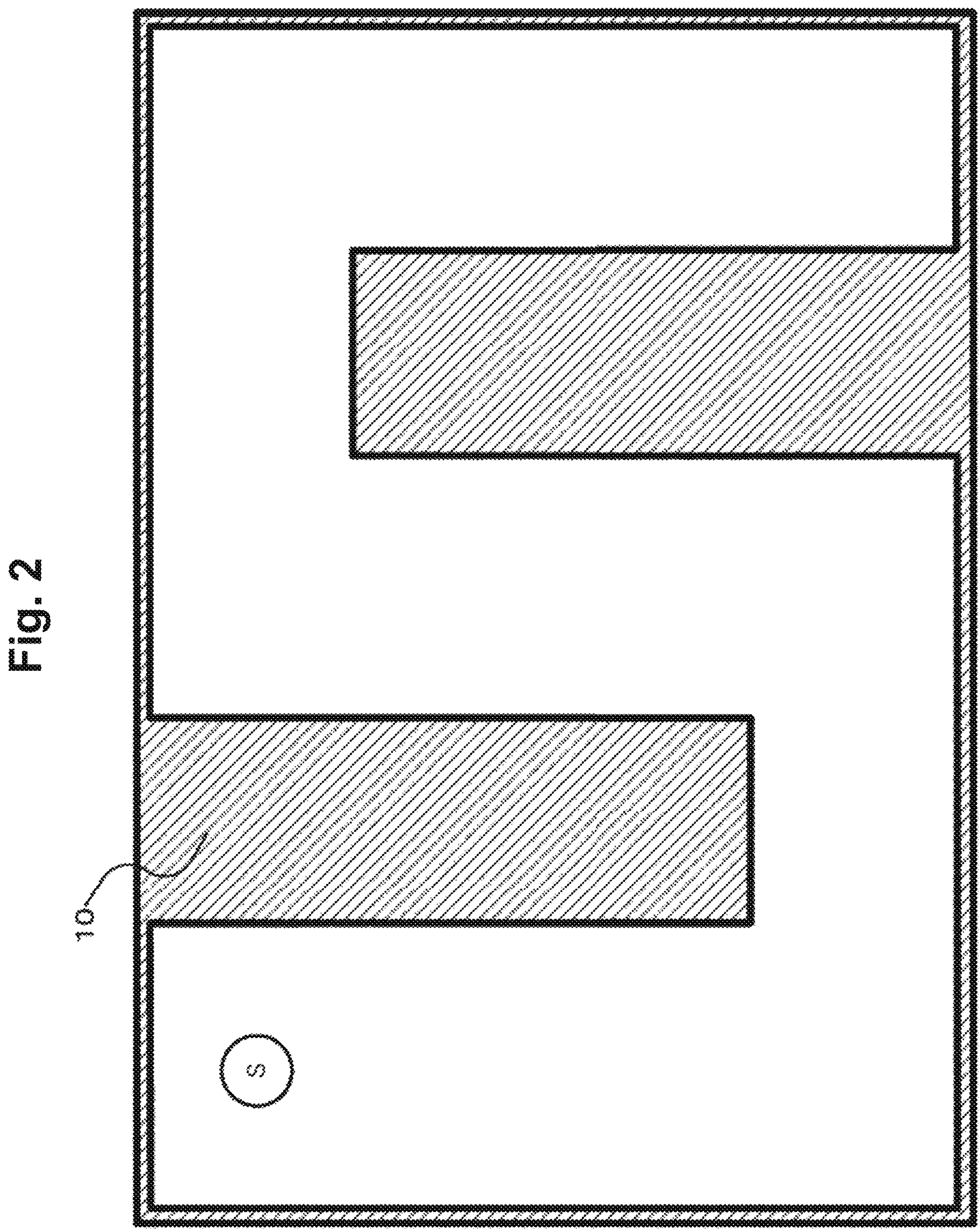
FIG. 2 is a diagram illustrating positions of a transmission station and an installed station candidate range.

Hereinafter, a configuration example of an installation position calculation device 1 of a relay station according to an embodiment will be described with reference to the drawings. FIG. 1 is a diagram illustrating a configuration example of an installation position calculation device 1 of a relay station according to an embodiment.

As illustrated in FIG. 1, an installation position calculation device 1 of a relay station according to an embodiment includes a storage unit 2, a processing unit 3, and a control unit 4 and calculates, for example, an installation position of a relay device (relay station) included in a wireless communication system using a high frequency band.

The control unit 4 controls each unit included in the installation position calculation device 1. The relay device is, for example, a reflecting plate that reflects and relays radio waves. The reflecting plate also includes a RIS reflecting plate.

The storage unit 2 includes, for example, a relay device information storage unit 21, an installed station candidate range storage unit 22, a total number-of-installed-stations storage unit 23, a transmission point storage unit 24, an LOS region storage unit 25, an installed station candidate point storage unit 26, and an installed station point storage unit 27.

The relay device information storage unit 21 stores characteristics and the like of the relay device included in the wireless communication system. For example, the relay device information storage unit 21 stores beforehand information indicating a dynamically controllable relayable range (a relay device cover area: a reflectable angle) in which the RIS reflecting plate serving as a relay device reflects radio waves.

The installed station candidate range storage unit 22 stores beforehand a range in which a relay device can be installed as an installed station candidate range. For example, in the example illustrated in FIG. 2, the entire range (the inside of a wall 10) surrounded by the wall 10 is the installed station candidate range of the relay device that reflects a radio wave transmitted by the transmission station S.

The total number-of-installed-stations storage unit 23 stores beforehand the total number of relay devices (total number of installed stations) that the operator plans to install in order to configure the wireless communication system.

The transmission point storage unit 24 stores the position of a transmission point. For example, the transmission point storage unit 24 stores beforehand the position of the transmission station S illustrated in FIG. 2 and the like as a transmission point.

The LOS region storage unit 25 stores the LOS regions from all the transmission points stored in the transmission point storage unit 24.

The installed station candidate point storage unit 26 stores, as an installed station candidate point, a position that has become a candidate point at which a relay device is installed through a process of the processing unit 3. The installed station candidate point storage unit 26 may store a plurality of installed station candidate points determined in advance as installation position candidates of the relay device.

When an installation position of the relay device is determined, the installed station point storage unit 27 stores the position of the relay device as the installed station point. For example, the installed station point storage unit 27 stores, as an installation position (installed station point) of the relay device, a position of an installed station candidate point identified by a first identification unit 32 to be described below or a position of an installed station candidate point identified by a second identification unit 36 to be described below. When the installation position of the relay device is determined, the installed station point storage unit 27 also stores the position of the relay device as a new transmission point.

The processing unit 3 includes an LOS region calculation unit 30, a candidate point extraction unit 31, a first identification unit 32, a next candidate point extraction unit 33, a Fresnel zone calculation unit 34, a correction unit 35, and a second identification unit 36.

Figure 3:
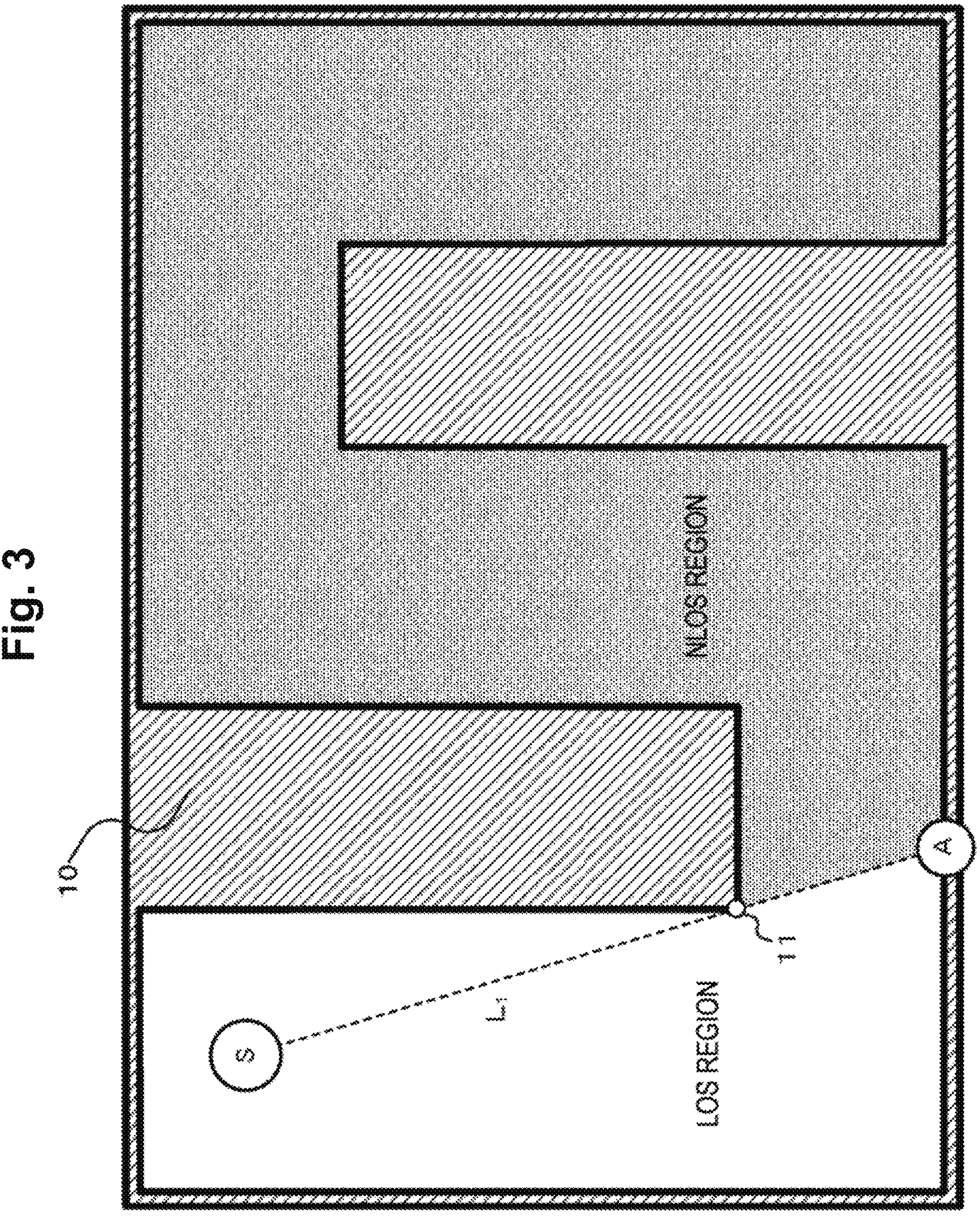
FIG. 3 is a diagram illustrating a boundary between an LOS region and an NLOS region.

The LOS region calculation unit 30 calculates the LOS region from the transmission points stored in the storage unit 2. For example, the LOS region calculation unit 30 calculates, as an LOS region, a range surrounded by the wall 10 illustrated in FIG. 3 and a line connecting the boundary point A and the boundary point 11 on the straight line $L_1$ passing through the boundary point 11 which is a vertex of the wall 10 and the transmission station S.

The candidate point extraction unit 31 extracts one or more installed station candidate points based on a straight line passing through a transmission point at which a radio wave is transmitted and orthogonal to a surface facing the transmission point (a reflective surface in the installed station candidate range) with regard to the installed station candidate range stored in the installed station candidate range storage unit 22, and outputs the installed station candidate points to the first identification unit 32.

Figure 4:
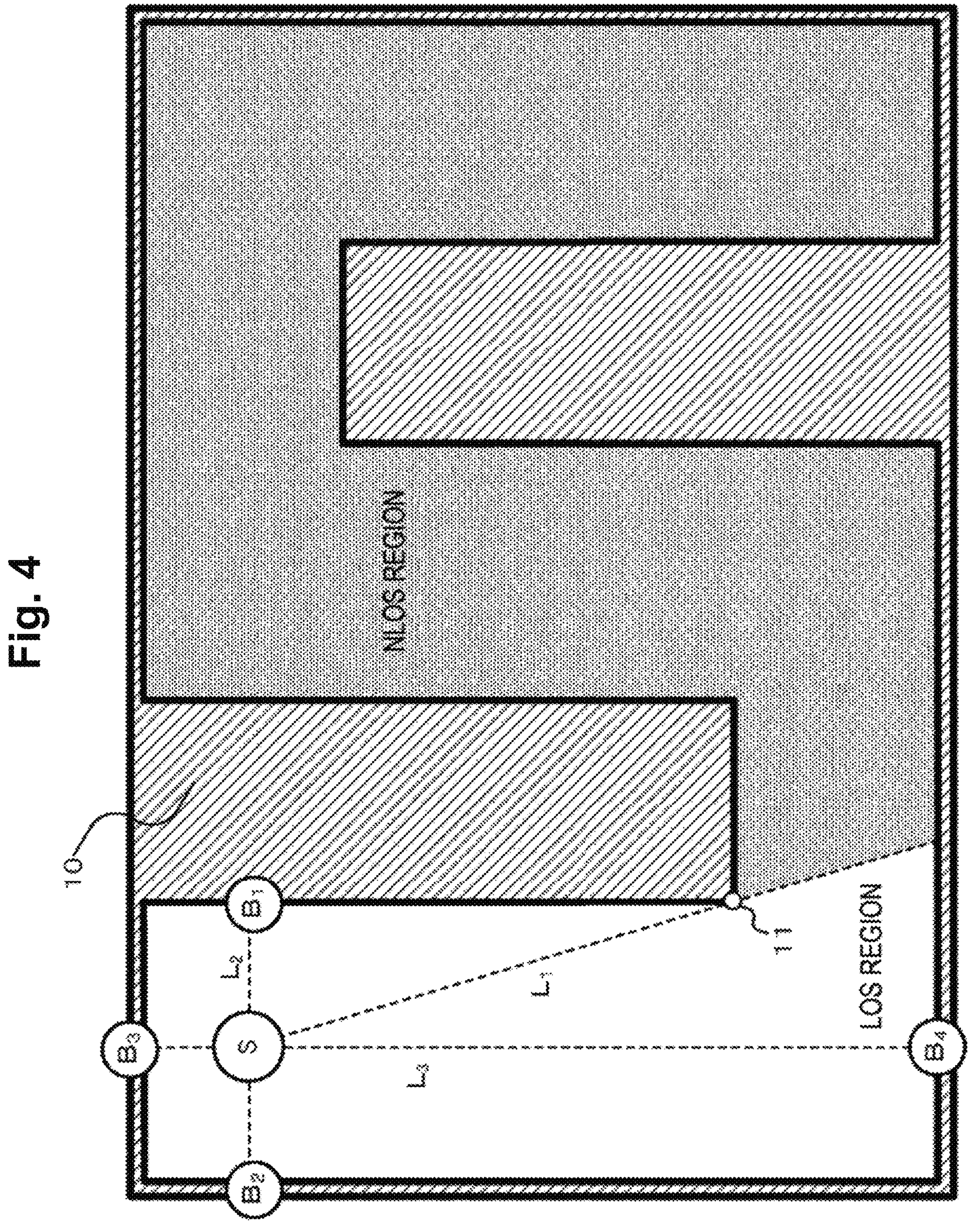
FIG. 4 is a diagram illustrating installed station candidate points extracted by a candidate point extraction unit.

For example, as illustrated in FIG. 4, the candidate point extraction unit 31 extracts installed station candidate points $B_1$ and $B_2$ on a straight line $L_2$ passing through the transmission station S and orthogonal to the wall 10 and installed station candidate points $B_3$ and $B_4$ on a straight line $L_3$ passing through the transmission station S and orthogonal to the wall 10, and outputs the installed station candidate points $B_1$, $B_2$, $B_3$ and $B_4$ to the first identification unit 32.

The first identification unit 32 identifies the position of the installed station candidate point at which the LOS region from the relay device is maximized, as the installation position of the first relay device, based on the relayable range stored in the relay device information storage unit 21 within the installed station candidate range stored in the installed station candidate range storage unit 22 or among the installed station candidate points stored in the installed station candidate point storage unit 26.

For example, the first identification unit 32 identifies any one position among the installed station candidate points extracted by the candidate point extraction unit 31 or the installed station candidate points stored in the installed station candidate point storage unit 26 as the installation position of the first relay device. In the example illustrated in FIG. 4, the first identification unit 32 identifies a position of an installed station candidate point $B_4$ as the installation position of the first relay device (see FIG. 5).

The next candidate point extraction unit 33 regards the installation position of the first relay device identified by the first identification unit 32 as the transmission point of the radio wave, and extracts the two or less top next installed station candidate points at which the next relay device maximizes the LOS region based on the relayable range of the radio wave by the next relay device.

Figure 5:
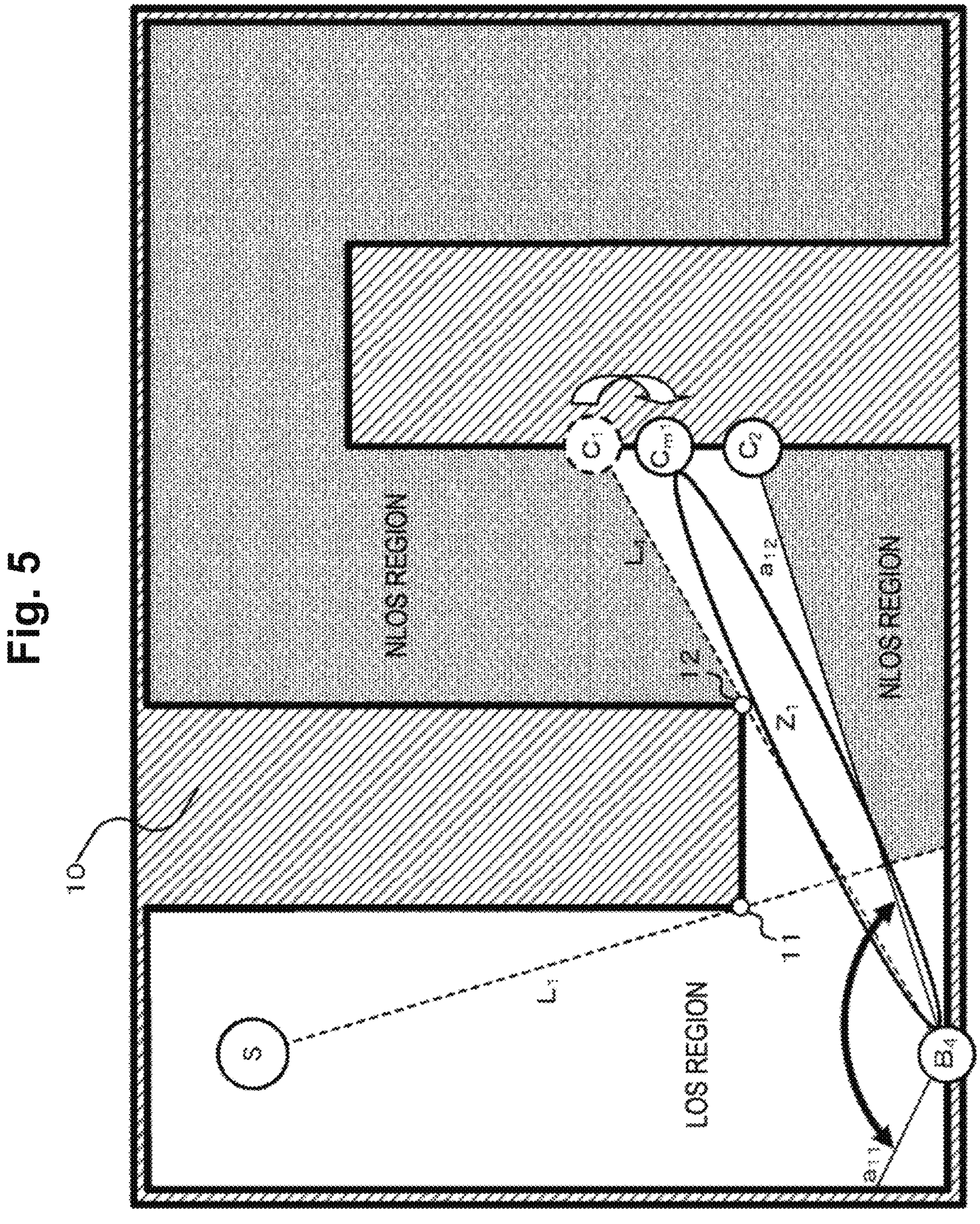
FIG. 5 is a diagram illustrating a next installed station candidate point extracted by a next candidate point extraction unit and a next installed station candidate point corrected by a correction unit.

For example, as illustrated in FIG. 5, the next candidate point extraction unit 33 regards the installation position $B_4$ of the relay device as a transmission point of a radio wave, and extracts the top next installed station candidate points $C_1$ and $C_2$ at which the next relay device maximizes the LOS region. At this time, the relayable range of the radio wave by the relay device installed at the installation position $B_4$ is a range sandwiched between straight lines $a_{11}$ and $a_{12}$.

The next installed station candidate point $C_1$ is one of the top two next installed station candidate points at which the LOS region is maximized, on a straight line $L_4$ passing through the installation position $B_4$ and the boundary point 12 that is a vertex of the wall 10. The next installed station candidate point $C_2$ is one of the top two next installed station candidate points at which the LOS region is maximized, on the straight line $a_{12}$ extending from the installation position $B_4$ to the wall 10.

The Fresnel zone calculation unit 34 calculates a Fresnel zone between a transmission point and an installed station candidate point (relay device). For example, the Fresnel zone calculation unit 34 calculates a Fresnel zone (see a Fresnel zone $Z_1$ illustrated in FIG. 5) between the transmission point and the next installed station candidate point.

The correction unit 35 corrects the position of each of the next installed station candidate points extracted by the next candidate point extraction unit 33 based on the Fresnel zone for the next relay device (a next installed station candidate point) calculated by the Fresnel zone calculation unit 34. For example, the correction unit 35 corrects the position of each of the next installed station candidate points extracted by the next candidate point extraction unit 33 so that no radio wave obstruction is located in the Fresnel zone for the next relay device.

Specifically, as illustrated in FIG. 5, the correction unit 35 performs correction to move a position of the next installed station candidate point $C_1$ to the next installed station candidate point $C_{m1}$ so that the boundary point 12 that is a vertex of the wall 10 does not enter the Fresnel zone $Z_1$. The correction unit 35 does not correct the position of the next installed station candidate point $C_2$ because no radio wave obstruction is located in the Fresnel zone (not illustrated) for the next installed station candidate point $C_2$.

The second identification unit 36 identifies, as an installation position of the next relay device, the position of the next installed station candidate point at which a reflection angle of the radio wave toward the next installed station candidate point extracted by the next candidate point extraction unit 33 or the next installed station candidate point of which the position is corrected by the correction unit 35 is minimized.

Here, a reflection angle at which the relay device installed at the installation position $B_4$ reflects the radio wave transmitted by the transmission station S toward the next installed station candidate point $C_{m1}$ is defined as X. A reflection angle at which the relay device installed at the installation position $B_4$ reflects the radio wave transmitted by the transmission station S toward the next installed station candidate point $C_2$ is defined as Y.

Figure 6:
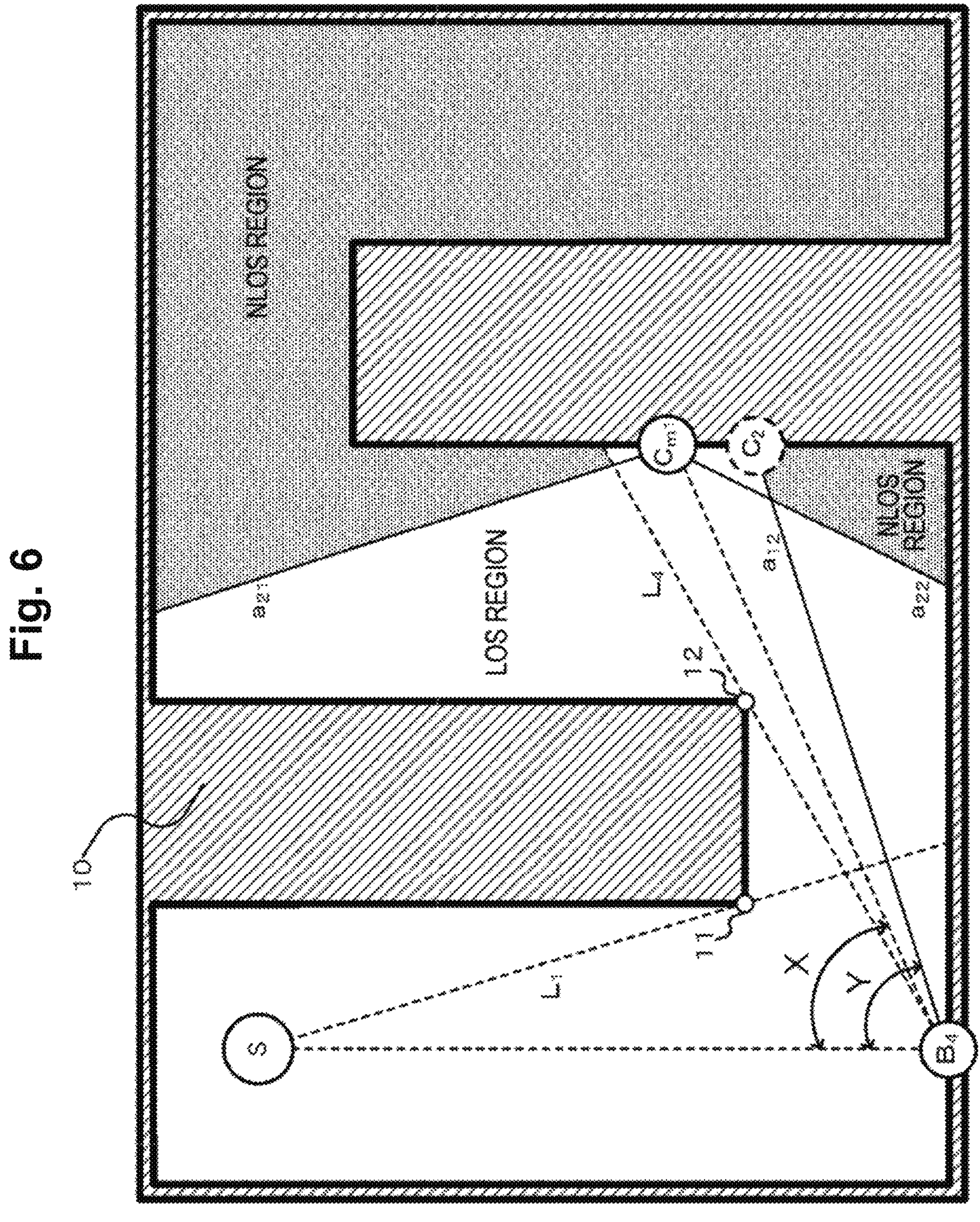
FIG. 6 is a diagram illustrating a boundary between an LOS region and an NLOS region when a relay device is installed at an installation position identified by a second identification unit.

For example, as illustrated in FIG. 6, since the reflection angle X is less than the reflection angle Y, the second identification unit 36 identifies the position of the next installed station candidate point $C_{m1}$ as an installation position of the next relay device.

FIG. 7 is a diagram illustrating an incident angle of a radio wave reflected by a reflecting plate. FIG. 7(*a*) is a diagram illustrating an effective area where a radio wave incident on the reflecting plate can be reflected when the incident angle is small (0 degrees). FIG. 7(*b*) is a diagram illustrating an effective area where a radio wave incident on the reflecting plate can be reflected when the incident angle is large.

As illustrated in FIG. 7, a reflectable effective area where a radio wave incident on the reflecting plate is greater when the incident angle on the reflecting plate is small than when the incident angle on the reflecting plate is large.

That is, when the relay device installed at the installation position $B_4$ reflects the radio wave, the second identification unit 36 identifies the position of the installed station candidate point $C_{m1}$ as an installation position of the next relay station because propagation efficiency of the radio wave at the installation position $B_4$ is better when the installation position of the next relay device is set to the next installed station candidate point $C_{m1}$ than when the installation station is set to the next installed station candidate point $C_2$.

At this time, the relayable range of the radio wave by the relay device installed at the next installed station candidate point $C_{m1}$ is a range sandwiched between the straight lines $a_{21}$ and $a_{22}$.

The control unit 4 performs control such that the total number of the installation positions of the relay devices identified by the first identification unit 32 and the second identification unit 36 (the total number of the installation points stored in the installed station point storage unit 27) becomes a predetermined number (for example, the total number of relay devices stored in the total number-of-installed-stations storage unit 23).

For example, when a one-hop installed station position is determined, the control unit 4 performs control such that two-hop installed station candidate points and three-hop installed station candidate points are sequentially calculated.

Figure 8:
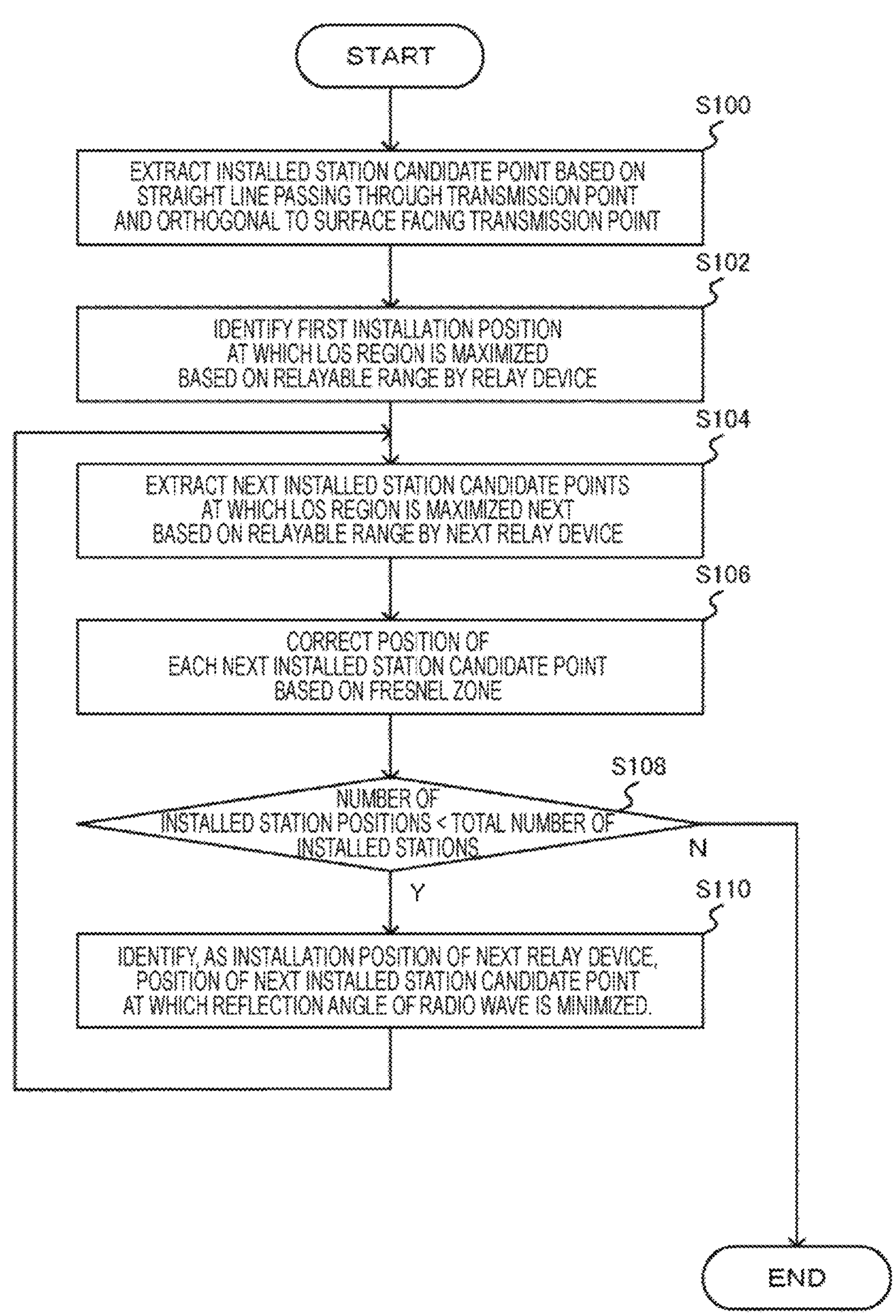
FIG. 8 is a flowchart illustrating an operation example of the installation position calculation device according to an embodiment.

Next, an operation example of the installation position calculation device 1 will be described with reference to FIG. 8. FIG. 8 is a flowchart illustrating an operation example of the installation position calculation device 1 according to the embodiment.

In step 100 (S100), the candidate point extraction unit 31 extracts an installed station candidate point based on a straight line passing through the transmission point (transmission station S) and orthogonal to the surface of the wall 10 facing the transmission point.

In step 102 (S102), the first identification unit 32 identifies the installation position of the first relay device that maximizes the LOS region based on the relayable range by the relay device.

In step 104 (S104), the next candidate point extraction unit 33 regards the installation position of the first relay device identified by the first identification unit 32 as the transmission point of the radio wave, and extracts the two or less top next installed station candidate points at which the next relay device maximizes the LOS region based on the relayable range of the radio wave by the next relay device.

In step 106 (S106), the correction unit 35 corrects the position of each of the next installed station candidate points extracted by the next candidate point extraction unit 33 based on the Fresnel zone calculated by the Fresnel zone calculation unit 34.

In step 108 (S108), the control unit 4 determines whether the number of installed station positions of the relay devices calculated by the installation position calculation device 1 is less than the total number of installed stations stored in the total number-of-installed-stations storage unit 23. When the number of installed stations is less than the total number of installed stations stored in the total number-of-installed-stations storage unit (Yes in S108), the control unit 4 moves to the process of S110. Otherwise (No in S108), the control unit 4 ends the process.

In step 110 (S110), the second identification unit 36 identifies, as the installation position of the next relay device, the position of the next installed station candidate point at which the reflection angle of the radio wave toward the next installed station candidate point extracted by the next candidate point extraction unit 33 or the next installed station candidate point of which the position is corrected by the correction unit 35 is minimized.

As described above, since the installation position calculation device 1 according to the embodiment identifies the position of the next installed station candidate point at which the reflection angle of the radio wave toward the next installed station candidate point is minimized as the installation position of the next relay station, it is possible to calculate the installation position of the relay station so that propagation efficiency of the radio wave to be relayed is prevented from deteriorating.

Some or all of the functions of the installation position calculation device 1 may be configured with hardware such as a programmable logic device (PLD) or a field programmable gate array (FPGA), or may be configured as a program executed by a processor such as a CPU.

For example, the installation position calculation device 1 can be implemented using a computer and a program, and the program can be recorded in a storage medium or provided through a network.

Figure 9:
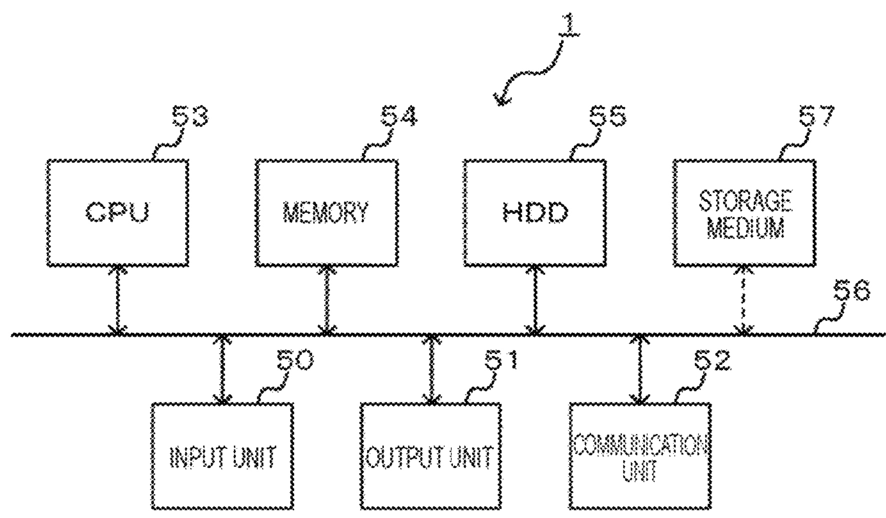
FIG. 9 is a diagram illustrating a hardware configuration example of the installation position calculation device according to the embodiment.

FIG. 9 is a diagram illustrating an exemplary hardware configuration of the installation position calculation device 1 according to the embodiment. As illustrated in FIG. 9, the installation position calculation device 1 has a function as a computer in which an input unit 50, an output unit 51, a communication unit 52, a CPU 53, a memory 54, and an HDD 55 are connected via a bus 56. The installation position calculation device 1 can input and output data to and from a computer-readable storage medium 57.

The input unit 50 is, for example, a keyboard, a mouse, or the like. The output unit 51 is, for example, a display device such as a display. The communication unit 52 is, for example, a network interface or the like.

The CPU 53 controls each unit included in the installation position calculation device 1 and performs a predetermined process or the like. The memory 54 and the HDD 55 correspond to the above-described storage unit 2 that stores data or the like.

The storage medium 57 can store a program or the like executing the function of the installation position calculation device 1. An architecture of the installation position calculation device 1 is not limited to the example illustrated in FIG. 9.

REFERENCE SIGNS LIST

1 Installation position calculation device
2 Storage unit
3 Processing unit
4 Control unit
10 Wall
21 Relay device information storage unit
22 Installed station candidate range storage unit
23 Total number-of-installed-stations storage unit
24 Transmission point storage unit
25 LOS region storage unit
26 Installed station candidate point storage unit
27 Installed station point storage unit
30 LOS region calculation unit
31 Candidate point extraction unit
32 First identification unit
33 Next candidate point extraction unit
34 Fresnel zone calculation unit
35 Correction unit
36 Second identification unit
50 Input unit
51 Output unit
52 Communication unit
53 CPU
54 Memory
55 HDD
56 Bus
57 Storage medium

The invention claimed is:

1. An installation position calculation device of a relay station comprising:

first identification circuitry configured to identify a position of an installed station candidate point at which an line of sight (LOS) region from a relay station is maximized, as an installation position of a first relay station, based on a relayable range of a radio wave by the relay station within an installed station candidate range in which the relay station relaying the radio wave is installable or among a plurality of installed station candidate points determined in advance as installation position candidates of the relay station;

next candidate point extraction circuitry configured to regard an installation position of the first relay station identified by the first identification circuitry as a transmission point of the radio wave, and extract two or less top installed station candidate point at which a next relay station maximizes an LOS region based on a relayable range of the radio wave by the next relay station;

correction circuitry configured to correct a position of each of the next installed station candidate points extracted by the next candidate point extraction circuitry based on a Fresnel zone for the next relay station;

second identification circuitry configured to identify, as an installation position of the next relay station, a position of a next installed station candidate point at which a reflection angle of the radio wave toward the next installed station candidate point extracted by the next candidate point extraction circuitry or the next installed station candidate point of which the position is corrected by the correction circuitry is minimized; and a controller configured to perform control such that a total number of installation positions of the relay stations identified by the first and second identification circuitries becomes a predetermined number.

2. The installation position calculation device of the relay station according to claim 1, further comprising:

candidate point extraction circuitry configured to extract one or more installed station candidate points from the installed station candidate range based on a straight line passing through a transmission point at which a radio wave is transmitted and orthogonal to a surface facing the transmission point, wherein the first identification circuitry identifies, as an installation position of the first relay station, a position of any one of the installed station candidate points extracted by the candidate point extraction circuitry or a plurality of installed station candidate points determined in advance as installation position candidates of the relay station.

3. The installation position calculation device of the relay station according to claim 1, wherein the correction circuitry corrects a position of each of the next installed station candidate points extracted by the next candidate point extraction circuitry such that no radio wave obstruction is located within a Fresnel zone for the relay station.

4. The installation position calculation device of the relay station according to claim 1, wherein the relay station is a reflecting plate that reflects the radio wave.

5. A non-transitory computer-readable storage medium storing an installation position calculation program of a relay station for causing a computer to function as each circuitry of the installation position calculation device of the relay station according to claim 1.

6. An installation position calculation method of a relay station comprising:

identifying a position of an installed station candidate point at which an line of sight (LOS) region from a relay station is maximized, as an installation position of a first relay station, based on a relayable range of a radio wave by the relay station within an installed station candidate range in which the relay station relaying the radio wave is installable or among a plurality of installed station candidate points determined in advance as installation position candidates of the relay station;

regarding an identified installation position of the first relay station as a transmission point of the radio wave, and extracting two or less top next installed station candidate point at which a next relay station maximizes an LOS region based on a relayable range of the radio wave by the next relay station;

correcting a position of each of the extracted next installed station candidate points based on a Fresnel zone for the next relay station;

identifying, as an installation position of the next relay station, the extracted next installed station candidate point or a position of a next installed station candidate point at which a reflection angle of the radio wave toward the next installed station candidate point of which the position is corrected is minimized; and performing control such that a total number of installation positions of the relay stations identified in the first and second identifying becomes a predetermined number.

7. The installation position calculation method of the relay station according to claim 6, further comprising:

extracting one or more installed station candidate points from the installed station candidate range based on a straight line passing through a transmission point at which a radio wave is transmitted and orthogonal to a surface facing the transmission point, wherein, in the first identifying, a position of any one of the installed station candidate points extracted in the extracting or a plurality of installed station candidate points determined in advance as installation position candidates of the relay station is identified as an installation position of the first relay station.

8. The installation position calculation method of the relay station according to claim 6, wherein, in the correcting, a position of each of the next installed station candidate points extracted in the extracting is corrected such that no radio wave obstruction is located within a Fresnel zone for the relay station.

* * * * *